March 10, 1964          A. N. ORMOND          3,124,342
ROLL FLEXURE
Filed Oct. 6, 1961

INVENTOR.
ALFRED N. ORMOND
BY Elliott & Pastoriza
ATTORNEYS

United States Patent Office 3,124,342
Patented Mar. 10, 1964

3,124,342
ROLL FLEXURE
Alfred N. Ormond, 11969 Riviera Road,
Santa Fe Springs, Calif.
Filed Oct. 6, 1961, Ser. No. 143,353
4 Claims. (Cl. 267—1)

This invention relates generally to flexures and more particularly to an improved roll flexure unit for connection to members between which relative rotational motion takes place.

Increasing the dimension of the flexure portion of a roll flexure to enable it to withstand large axial loads results generally in a corresponding increase in the stiffness of the flexure, thus limiting its useability. For example, a simple torsion rod can be employed as a roll flexure and is capable of accommodating large tension or compression axial loads. On the other hand, a torsion rod is very stiff with respect to its torsional flexing characteristics if it is to be kept within workable lengths resulting in relatively small displacements for large input torques. Further, a torsion rod, while accommodating axial loads, is vulnerable to side or shear loading.

In my United States Patent No. 2,984,996, there is described a roll flexure unit capable of withstanding relatively high axial tension and compressional forces and yet which is relatively sensitive to roll or rotational motion. Roll flexures of this type are usually employed in relatively large installations or mounting structures such as used in testing of missiles. The required strength of the flexures in question necessitates unique design features to insure their capability of withstanding large compression, tension, shear, and normal bending forces.

While the flexure unit described in the foregoing mentioned patent solves to a considerable extent some of the problems encountered with prior art roll flexures, any improvement in the strength of the roll flexure with respect to compression, tension, shear, and bending forces without increasing the overall stiffness of the flexure is always desirable.

With the foregoing in mind, it is a primary object of the instant invention to provide an improved roll flexure over that shown and described in the above-mentioned patent capable of withstanding larger axial compression and tension forces while permiting relatively large displacements for normal input torques to the end that greatly increased accuracy in roll measurements can be achieved.

Briefly, the foregoing as well as other objects and advantages of this invention are achieved by providing a roll flexure having certain features in common with the flexure described in my U.S. Patent No. 2,984,996 but incorporating additional flexure means for increasing the strength of the unit against tension, compression, shear, and bending forces. The preferred embodiment of the invention includes first and second end plates in parallel relationship to each other and spaced along a roll axis normal to the plates. A cruciform structure extends axially between and is secured to opposing surfaces of the plates. In addition to the cruciform structure, there is provided a plurality of parallel columns extending between and secured to the opposing surfaces of the plates adjacent to the cruciform structure. These columns serve to increase the strength of the flexure with respect to axial loading without unduly increasing the overall stiffness of the unit.

A better understanding of the invention will be had by now referring to a preferred embodiment thereof as illustrated in the accompanying drawings, in which.

Figure 1:
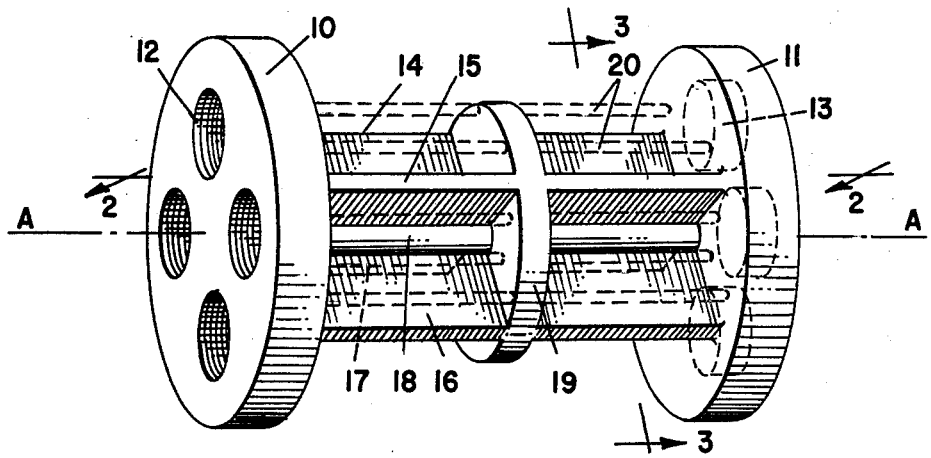
FIGURE 1 is an overall perspective view of the flexure unit with certain portions illustrated in dotted lines for convenience of illustration.
Figure 2:
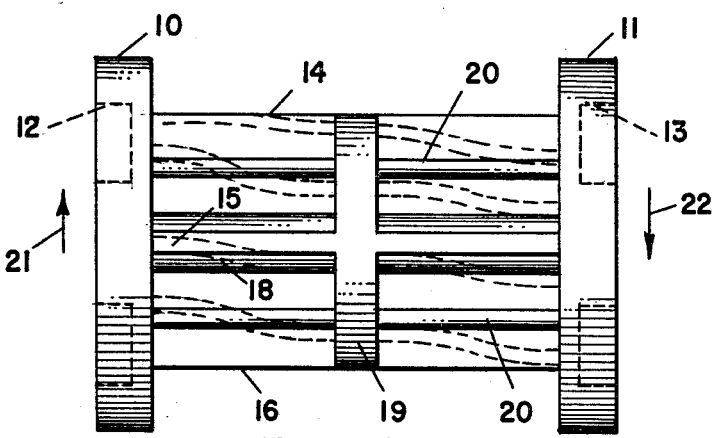
FIGURE 2 is a side elevational view taken in the direction of the arrows 2—2 of FIGURE 1.

Referring to FIGURES 1 and 2, the flexure comprises first and second end plates 10 and 11 each provided, respectively, with suitable securing means such as threaded bores 12 and 13 for attachment to members between which rotational motion takes place. As shown, the plates 10 and 11 are parallel and spaced along a roll axis A—A normal to the opposing surfaces of the plates.

Extending between the end plates 10 and 11 is a cruciform structure including first, second, third, and fourth flexure webs 14, 15, 16, and 17, respectively. The opposite ends of these webs are secured in rigid relationship with respect to each other to the opposing surfaces of the end plates 10 and 11. Preferably, the webs are successively spaced at ninety degrees to each other, the webs themselves extending radially from a central hub 18 with respect to the axis A—A.

In the particular embodiment chosen for illustrative purposes, the flexure includes a central plate 19 rigidly secured to mid-portions of the various webs as shown. The unit is completed by a plurality of columns 20 only a few of which are illustrated in dotted lines in FIGURE 1 running parallel to the axis A—A between the end plates 10 and 11. The opposite ends of these columns are secured rigidly to the opposing surfaces of the end plates and have their mid-portions rigidly secured to the central plate 19.

While not illustrated in FIGURES 1 and 2 to avoid obscuring other portions of the drawing, there are preferably provided a relatively large number of the columns 20. For example, referring to the cross section of FIGURE 3, it will be noted that the various columns are distributed in a symmetrical manner adjacent to the webs 14, 15, 16, and 17. While only thirty-two such columns are shown, many more would normally be employed. In the preferred construction, the total cross-sectional area occupied by the columns and the cruciform structure is substantially equal to fifty percent of the area of the opposing surface of the end plate 11 to which the columns and cruciform structure are secured. Increasing the number of columns beyond the number necessary to cover substantially fifty percent of the area of the end plate would tend to result in a removal of too much supporting material in the end plate for securing the columns in rigid relationship with respect to each other. If the total cross-sectional area of the columns and cruciform structure is less than about fifty percent of the area of the end plate, there is then an unnecessary excess of mass in the end plates.

The central plate 19 shown in FIGURE 2 will permit smaller diameter rods to be employed than would be the case were the rods to extend continuously the entire distance between the end plates 10 and 11. In other words, the central plate 19 stabilizes the mid-portions of the rods so that thinner rods may be employed and yet provide the same strength against shear and bending forces as would be provided by larger diameter rods without the central plate.

In the operation of the flexure, the end plates 10 and 11 are secured to members between which rotational motion takes place. The resulting torque or twisting will tend to rotate the end plates 10 and 11 in opposite directions such as indicated, for example, by the arrows 21 and 22 in FIGURE 2. This twisting force will distort the flexure webs and columns as indicated in highly exaggerated manner by the dotted lines in FIGURE 2. The functioning of the central plate 19 will be clear from this dotted line showing. Essentially, it provides a structure equivalent to two roll flexures connected in series with each other so that the degree of roll for a given torque is substantially doubled as compared to a unit in which columns are only that length corresponding to the distance between the central plate and one of the end plates.

Figure 3:
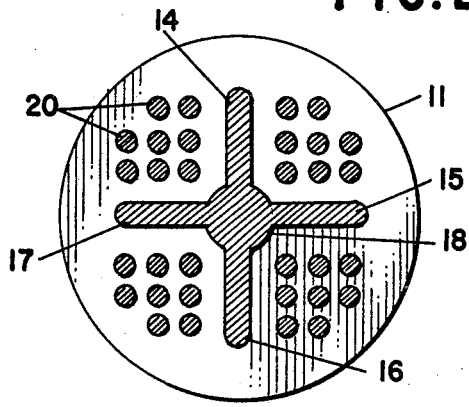
FIGURE 3 is a cross section taken in the direction of the arrows 3—3 of FIGURE 1.

From FIGURE 3, it will be evident that the distribution of the columns is such that the end plates are stabilized against bending moments to a greater degree than would be the case were only the cruciform webs 14, 15, 16, and 17 present. On the other hand, the provision of a number of individual columns such as shown at 20 will not unduly increase the overall stiffness of the flexure.

From the foregoing description, it will thus be seen that the present invention has provided an improved roll flexure which provides a unit capable of withstanding relatively large axial tension and compression as well as shear and bending forces and yet in which a relatively large degree of rotational motion may take place for a given input torque.

While only one particular embodiment of the invention has been shown and described, it will be understood that various modifications and changes within the scope and spirit of the invention may be effected by those skilled in the art.

What is claimed is:

1. A roll flexure comprising, in combination: first and second end plates in parallel relationship to each other and spaced along a roll axis normal to said plates; a flexure structure extending axially between and secured to opposing surfaces of said plates, said flexure structure including a plurality of flexure webs radially extending from said roll axis and successively spaced at equal angles from each other; a plurality of columns extending in parallel relationship between and secured to said opposing surfaces of said plates adjacent to said webs; and a central plate disposed midway between said end plates and secured to mid portions of said webs and columns.

2. A flexure according to claim 1, in which each of said end plates includes means for securing the same to first and second members, respectively, between which rotational motion takes place.

3. A flexure according to claim 2, in which the total cross-sectional area occupied by said webs and columns between said end plates is substantially equal to fifty percent of the area of an opposing surface to which said webs and columns are secured.

4. A roll flexure comprising, in combination: first and second end plates spaced along a roll axis about which rotational motion takes place; a plurality of flexure webs extending radially from said roll axis between said plates and having their ends rigidly secured to said plates; and a plurality of columns parallel to each other and to said roll axis extending between said plates with their opposite ends rigidly secured to said plates, said columns being disposed adjacent to said flexure webs so that said flexure webs extend radially between various ones of said columns so that some of said columns are secured to the area of said end plates between said flexure webs.

References Cited in the file of this patent

UNITED STATES PATENTS

| 306,472 | Feith | Oct. 14, 1884 |
| 1,232,922 | Hobbs | July 10, 1917 |
| 2,822,677 | Reynolds | Feb. 11, 1958 |
| 2,984,996 | Ormond | May 23, 1961 |

FOREIGN PATENTS

| 218,114 | Great Britain | July 3, 1924 |
| 756,731 | France | Sept. 25, 1933 |